F. H. AND F. O. BALL.

CARBURETER.

APPLICATION FILED JUNE 23, 1919.

Reissued Dec. 30, 1919.

14,780.

3 SHEETS—SHEET 1.

Inventors
Frank H. Ball
and
Frederick O. Ball
By
H. R. Lord
Attorney

F. H. AND F. O. BALL.

CARBURETER.

APPLICATION FILED JUNE 23, 1919.

Reissued Dec. 30, 1919.

14,780.

3 SHEETS—SHEET 2.

Inventors
Frank H. Ball
and
Fredrick O. Ball

By W. Z. Lund

Attorney

F. H. AND F. O. BALL.

CARBURETER.

APPLICATION FILED JUNE 23, 1919.

Reissued Dec. 30, 1919.

14,780.

3 SHEETS—SHEET 3.

Inventors
Frank H. Ball
and
Frederick O. Ball

By W. R. Lund
Attorney

UNITED STATES PATENT OFFICE.

FRANK H. BALL AND FREDERICK O. BALL, OF DETROIT, MICHIGAN, ASSIGNORS TO BALL & BALL CARBURETOR COMPANY, OF DETROIT, MICHIGAN, A CORPORATION OF MICHIGAN.

CARBURETER.

14,780. Specification of Reissued Letters Patent. Reissued Dec. 30, 1919.

Original No. 1,269,576, dated June 18, 1918, Serial No. 53,898, filed October 4, 1915. Application for reissue filed June 23, 1919. Serial No. 306,217.

*To all whom it may concern:*

Be it known that we, FRANK H. BALL and FREDERICK O. BALL, citizens of the United States, residing at Detroit, in the county of Wayne and State of Michigan, have invented new and useful Improvements in Carbureters, of which the following is a specification.

This invention relates to carbureters and consists in certain improvements in the construction thereof as will be hereinafter fully described and pointed out in the claims.

The invention is illustrated in the accompanying drawings as follows:—

Figure 1:
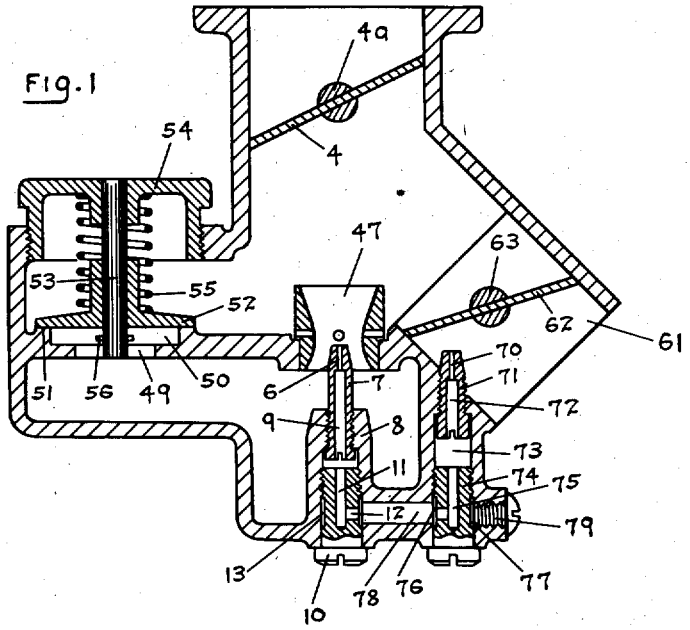
Figure 3:
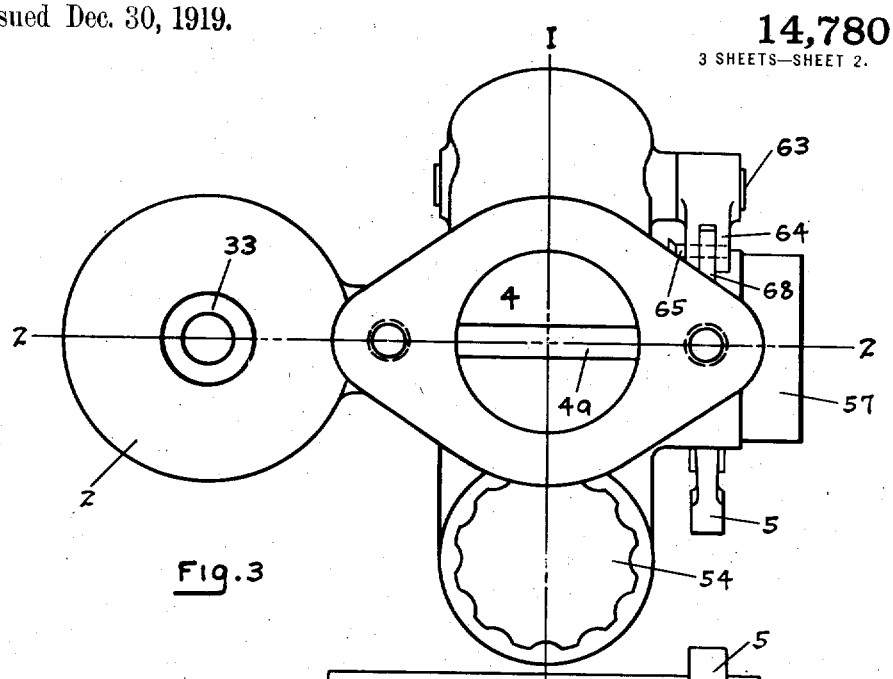
Figure 4:
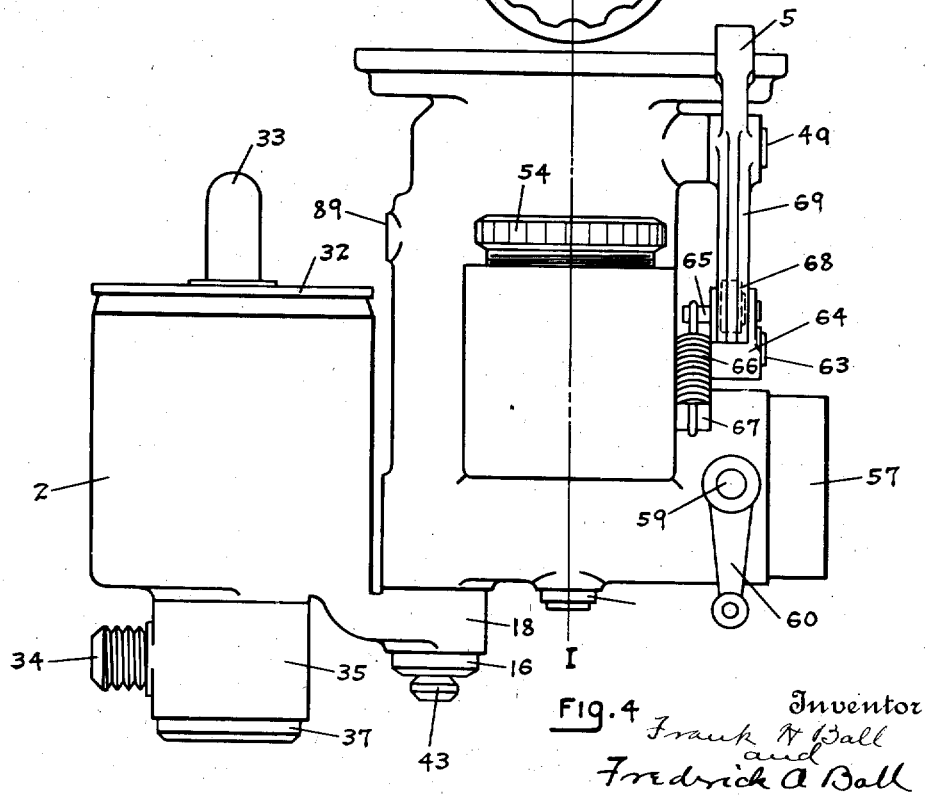

Figure 1 shows a section through the carbureter on the lines 1—1 in Figs. 3 and 4.

Figure 2:
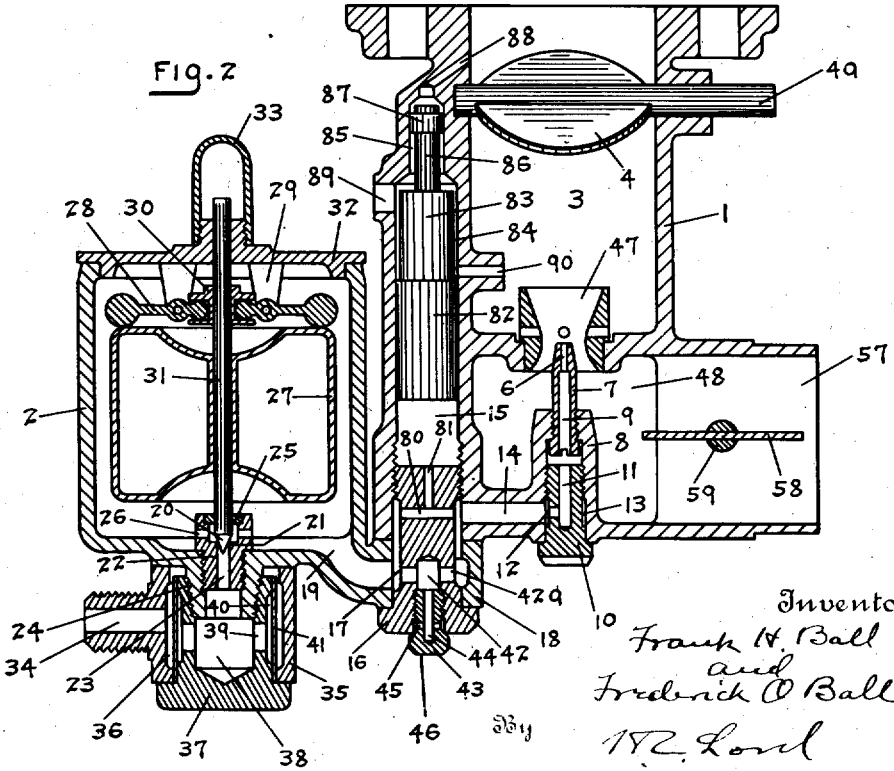
Figure 5:
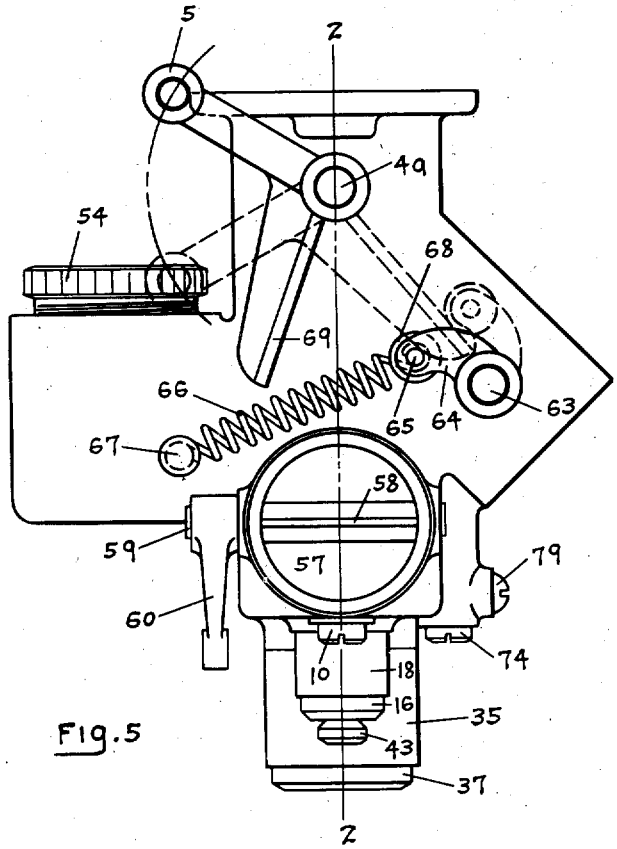

Fig. 2 a section on the lines 2—2 in Figs. 3 and 5.

Fig 3 a plan view of the carbureter.

Fig. 4 an elevation of the carbureter.

Fig. 5 an elevation of the carbureter, the point of view being at right angles to that shown in Fig. 4.

The carbureter is formed of two main parts, 1 the body having the controlling devices including the mixing chamber and 2 the float chamber with its parts. Part 1 has the mixing chamber 3 at the upper end of which there is arranged a throttle 4. The throttle 4 is in the form of a butterfly valve mounted on the stem $4^a$ which extends to without the body 1. A controlling lever 5 is fixed on the stem $4^a$ and any convenient means (not shown) for controlling the throttle extends from the lever 5.

The fuel is supplied to the mixing chamber through the nozzle 6. The nozzle is arranged in a nozzle fitting 7 in the form of a screw having the passage 9. The fitting 7 is screwed into the nozzle passage 8, this passage having a stepped opening, the opening of smaller diameter receiving the fitting 7 and that part of larger diameter being of sufficient size to receive the head of the screw. A plug 10 is screwed into the larger diameter of the nozzle passage. It has a central opening 11 extending downwardly from its top and this is connected by a restricted radial opening 12 with an annular passage 13 formed by reducing the size of the plug 10. A horizontal passage 14 formed in the body 1 leads to the annular passage 13. The horizontal passage 14 communicates with the lower end of a tubular chamber 15. The lower end of the tubular chamber 15 is closed by a plug 16 which has a reduced portion forming an annular passage 17. The plug 16 is screwed into the annular chamber 15, the screw threaded portion being above the horizontal passage 14 so that the annular passage 17 forms a means of communication but the upper part of the chamber 15 is separated from the main body of this passage. The float chamber 2 has a projection 18 with an opening through it of the same size and registering with the bottom of the tubular chamber 15 and the screw plug 16 extends through this opening thus clamping the projection on the bottom of the body 1 thus forming a means of connection between the two main parts of the carbureter. The passage 19 extends from the bottom of the float chamber to the opening in the projection 18 and forms a means of communication between the float chamber and the annular passage 17. It will be readily seen, therefore, that the float chamber is in direct connection with the nozzle and that the level of fuel at the nozzle will be that maintained by the float in the float chamber.

The flow of fuel to the float chamber is controlled by the needle valve 20 acting on the valve seat 21. The valve seat is arranged in a screw plug 22 having the axial passage 23. The screw plug extends into a screw threaded projection 24 on the bottom of the float chamber. The valve stem 31 extends through a guide 25 at the top of the screw plug and the axial passage in the screw plug is connected with the float chamber by the radial passages 26. The float 27 is slidingly mounted on the stem 31 and operates against the weighted levers 28. These levers are pivoted between the ears 29 and engage a spool 30 fixed on the stem 31. The ears 29 extend downwardly from a removable cover 32 and the stem extends upwardly through the cover and into a removable cap 33.

Fuel is delivered to the inlet passage 34 from any convenient source of supply. The inlet passage is in a projection extending from the sleeve 35. The sleeve 35 is clamped on the bottom of the float chamber by means of the internally screw threaded plug 37 which is screwed onto the projection 24.

The screw 37 has an axial opening 38 communicating with the passage leading to the float chamber and radial openings 39. It has an annular groove 40 extending around it and the sleeve 35 has an annular groove 36 around it, these grooves forming a chamber. A strainer 41 is arranged over the screw 37 taking an intermediate position in the chamber formed by the grooves 40 and 36. It will be readily seen that the gasolene is strained by this strainer and that by its annular shape sufficient capacity is given to the strainer.

In order to readily drain the float chamber the screw plug 16 is provided with an axial opening 42 connected with the passage 17 by the radial openings 42[a]. A screw plug 43 is screwed into the opening 42 and has an axial passage 44 communicating with the opening 42. Radial passages 45 extend from the passage 44. The head 46 of the screw plug 43 seats on the bottom of the screw plug 16 around the opening 42 thus making a closure. A slight backing off of the screw 43 forms a passage between the head 46 and the bottom of the screw 16 thus forming a means for draining the passages and float chamber.

An air passage 47 is arranged around the nozzle and forms an initial air passage leading to the mixing chamber. The passage is so arranged that the air passing through it takes up the fuel from the nozzle 6. The air led through the passage 47 is taken from the passage 48 and the secondary air passage 49 extends from the passage 48 to the mixing chamber 3. The passage 49 has an extension 50 of larger diameter than the passage proper and the passage 50 is surrounded by a seat 51 on which the air valve 52 rests. The air valve is slidingly mounted on the pin 53 carried by the adjustable nut 54. A spring 55 extends between the nut 54 and the valve 52 and resists the opening of the valve 52. The spring may be adjusted by screwing the nut 54 in and out as desired. A pin 56 is arranged in the end of the pin 53 and prevents the escape of the valve 52 from the pin 53 when the nut 54 is entirely removed from the body of the carbureter. The large valve 52 with the extension 50 on the passage 49 limits the influence of the valve on the flow of air to a very short period during the initial opening of this valve. In the later stages of the operation of this carbureter the flow of air for all practical purposes is controlled by the size of the opening 49 so that in these later stages the carbureter operates largely as one having fixed orifices or passages for the air and fuel. The extent of the control of the air by the valve may be varied by the nut 54.

Air is delivered to the passage 48 through an opening 57. This opening is cylindrically shaped and a choke valve 58 is arranged in this opening. The valve 58 is of the butterfly type and is mounted on a stem 59 which extends through the walls of the opening 57. An arm 60 is arranged on the stem 59 by means of which the choke valve 58 may be adjusted. In this carbureter the variation in quality is accomplished by the adjustment of this choke valve. This varies the resistance to the flow of air and consequently the quantity of fuel which is delivered with a given reduction of pressure in the mixing chamber. For this reason the usual needle valve for adjusting the fuel flow is not necessary. Such an adjustment so varies the capacity of the carbureter that where the single apparatus is used such as is thus far described it is not usually desirable but where the carbureter is supplemented as with this carbureter with a secondary carbureter taking care of the ultimate capacity this adjustment is of importance because while it makes the adjustment of the primary carbureter possible without the additional adjustment of the fuel passage it does not have sufficient influence on the ultimate capacity to interfere with the general operation of the carbureter. While choke valves have been used to momentarily vary the quality of mixture as at starting it has not been practical to utilize this for the normal adjustment because of its effect on the ultimate capacity of the carbureter.

The secondary carbureter is as follows:—Extending at a downward slant from the mixing chamber is an opening 61. This is initially closed by a butterfly valve 62. The butterfly valve 62 is carried by a stem 63, this stem extending through the walls of the carbureter. An arm 64 is fixed on the stem 63 (see Fig. 5). A pin 65 extends from the outer end of this arm and the spring 66 is secured to the pin 65 and to a pin 67 arranged on the outer wall of the carbureter. This spring tends to hold the valve 62 in its closed position as clearly shown in Fig. 1. The roller 68 is arranged in the end of the arm 64 and this is in the path of an arm 69 extending from the throttle lever 5. The length of the arm 64 with relation to the arm 69 is very short so that a comparatively slight movement of the arm 69 will move the arm 64 sufficiently to move the valve 62 from closed position to wide open position. The arm 69 is so arranged relatively to the throttle lever that it contacts the roller 68 in a late stage of the opening of the throttle and opens the valve 62 with the full opening of the throttle.

Fuel is delivered to the secondary carbureter from the nozzle 70. This nozzle is arranged in a screw plug 71 having the axial opening 72 communicating with the nozzle opening 70. A passage 73 is formed in the carbureter body and this is of two diameters, the smaller diameter receiving the screw plug 71 and the larger diameter of the passage being large enough to receive the head of the screw. The screw plug 74 is screwed into the lower end of the passage 73. The screw plug has the axial opening 75 from which the restricted radial opening 76 extends. A groove 77 is arranged around the screw plug forming an annular passage with which the radial opening 76 communicates. The passage 78 extends from the passage 14 and supplies fuel to the second nozzle. Preferably the passage 78 is extended through the body and the opening is closed by the screw 79.

In the operation of this secondary carbureter, the opening 61 controls the resistance to the air and forms with the nozzle what is known as a fixed orifice carbureter, the fuel being controlled by the restricted openings formed by the nozzle 70 and the opening 76 and the air being controlled by the opening 61. The relations of these passages are such as to give to this secondary carbureter a richer mixture than the primary carbureter. The reason for this is that to get maximum power a richer mixture is desirable than that used under ordinary conditions. The primary carbureter here shown on account of the pick-up device hereinafter described is adjusted to a very lean mixture, leaner than would be practical without such device and leaner than would be desirable except for this secondary carbureter. The mixture from the secondary carbureter is, therefore, not only richer than that of the primary cabureter but also richer than would be desirable even for maximum power, it being enough richer than would thus be desirable to supplement the lean mixture of the primary carbureter so that the mixture as a whole is richer than commonly used under ordinary conditions. This gives to the carbureter a very sensitive control, an air velocity assuring atomization and a mixture giving the greater efficiency in the ordinary range of operations, and at the same time great capacity and a rich mixture where high power is desired.

The valve 62 when closed cuts off the influence of the reduced pressure of the mixing chamber on the nozzle 70. This nozzle under these conditions is subjected to atmospheric pressure.

We prefer to use a number of restricted openings arranged in a series to resist the flow of fuel and thus control it. In the present instance two have been used, the nozzle 6 and the opening 12 in the primary carbureter and the nozzle 70 and opening 76 in the secondary carbureter. Where a single restricted opening or nozzle is used, the size of the opening must be made so small that it often clogs even where careful straining of the gasolene is resorted to. By supplementing the restricted opening at the nozzle by a second restricted opening an equal resistance can be accomplished with considerably larger openings, and the danger of clogging is, therefore, much reduced. In the structure as shown both the nozzle and the second restricted opening are arranged in removable screw plugs so that the size of these openings may be readily changed by a change of these parts.

When the throttle is suddenly opened in the carbureter the mixture is momentarily leaner than it should be and this prevents a rapid pick-up. To obviate this difficulty, we have provided a device actuated by variations of pressure on the discharge side of the throttle for delivering to the carbureter a supply of fuel supplementing that from the regular fuel nozzle so as to give a rapid pick-up.

The tubular chamber 15 is extended upwardly and is connected with the passage 17 surrounding the screw plug 16 through the radial openings 80 in the screw plug and the axial opening 81 extending upwardly from the radial opening 80. The opening 81 is a restricted passage allowing a slight flow of fuel into the chamber above the plug 16. A plunger 82 is arranged in the chamber 15 and forms a loose fit with the chamber so that when the plunger drops the fuel in the chamber 15 below the plunger is forced between the walls of the plunger and the chamber to the space in the chamber above the plunger. The plunger 82 has an extension 83 of slightly smaller diameter than the plunger so that when the plunger drops the space 84 above the plunger is such as to give a greater depth of fuel above the plunger. The lower end of the plunger 82 when resting on the top of the plug 16 closes the opening 81 so that when the plunger 82 drops, fuel is maintained at a level above the plunger and in the space 84 and above the extension 83. The cylinder 85 extends upwardly from the chamber 15 and the extension 86 projects from the plunger 82 into the cylinder. A piston 87 is arranged on the upper end of the extension 86 and makes a sliding fit with the cylinder. The upper end of the cylinder 85 is connected by a passage 88 with the periphery of the carbureter at the discharge side of the throttle so that the upper end of the cylinder is subjected to variations of pressure which take place above the throttle. Air is admitted to the upper end of the chamber 15 through a passage 89 and the passage 90 extends from the chamber 15 into the mixing chamber at a point preferably just above the initial air opening 47.

The operation of the pick-up device is as follows:—With a small opening of the throttle, the pressure above the throttle is reduced sufficiently to effect the lifting of the plunger 82 through the differences in pressure below and above the piston 87. If, however, the throttle is suddenly opened, the pressure above the throttle more nearly approximates atmospheric pressure and the difference of pressure on the piston under these conditions will not be sufficient to retain the plunger in its upper position and the plunger will, therefore, drop by gravity forcing the fuel below the enlarged part of the plunger to a position above it, and also closing the opening 81. In the continued operation of the carbureter the air entering through the passage 89 and delivered by the passage 90 carries with it the gasolene in the upper end of the chamber 15 thus momentarily enriching the mixture and insuring immediate pick-up. When, however, the throttle is again moved to a more nearly closed position and the pressure above the throttle is reduced the difference in pressure on the piston 87 immediately lifts the plunger to its upper position allowing the lower end of the chamber 15 to fill with a new charge of fuel. The plunger is retained in this upper position until the throttle is again changed. It will be noted that the delivery of fuel for the pick up through the opening 90 in no way disturbs the normal flow of fuel through the nozzles. Consequently the flow through the nozzles is immediately brought to the proper acceleration to balance the air delivery. This is important in that it is the disturbance between this equilibrium on the sudden opening of the throttle that the pick up device is designed to neutralize.

It will be noted also that the plunger acting over the opening 81 operates as a valve in the auxiliary passage afforded through the pick-up for the added fuel and that this valve is controlled by the fluctuations of pressure above the throttle acting on the piston 87. It will also be noted that with the plunger in its extreme upper position the extension 85 very nearly covers the opening 89 and restricts the passage of air through this opening and consequently the passage of air through the opening 9. This modifies the pressure in the well increasing to some extent the reduction below atmosphere and consequently increases the fuel level as it builds up in the well and also reduces the flow of air through the passage 90 so as to disturb the proportions of fuel and air delivered through the passage 47.

In the ordinary adjustment of a carbureter the adjustment is a compromise, a little richer than is required for best efficiency but better than the extremely lean mixture for pick-up. On the other hand, this over-rich mixture does not supply the requirements when the throttle is suddenly opened. With this carbureter a mixture leaner than would ordinarily be practical can be used for ordinary running and the pick-up device supplies all that is required for sudden openings of the throttle and the secondary carbureter the quality for extreme power.

What we claim as new is:—

1. In a carbureter, the combination of a primary carbureter comprising a mixing chamber, a throttle valve, a fuel nozzle, an air inlet, and means for varying the air inlet to vary the normal quality of mixture; and a secondary carbureter supplementing the delivery of mixture from the primary carbureter normally out of action and comprising a fuel nozzle; an air passage leading to the mixing chamber and to which the nozzle leads, a closure valve for closing the passage, and devices acting through the latter portion of the opening movement of the throttle for opening the closure valve.

2. In a carbureter, the combination of a primary carbureter comprising the throttle valve, a rotative stem carrying said valve, a rock lever on the stem for actuating the valve, a fuel nozzle, and an air inlet; and a secondary carbureter supplementing the delivery of mixture from the primary carbureter normally out of action comprising a fuel nozzle, an air passage to which the nozzle leads, a closure valve for closing said passage, a rocking stem on which the closure valve is mounted, a lever on said stem, said lever being of shorter length than the throttle lever and arranged in the path of the throttle lever and positioned to be actuated as the throttle reaches the later stages of its opening movement.

3. In a carbureter, the combination of a primary carbureter comprising a throttle valve, a rotative stem carrying said valve, a rock lever on the stem for actuating the valve, a fuel nozzle, and an air inlet; and a secondary carbureter supplementing the delivery of mixture from the primary carbureter normally out of action comprising a fuel nozzle, an air passage to which the nozzle leads, a closure valve for closing said passage, a rocking stem on which the closure valve is mounted, a lever on the closure valve, said lever being shorter that the lever on the throttle and arranged in the path of said lever in position to be opened as the throttle reaches its open position, and a spring operating on the closure valve lever for maintaining the closure valve normally in a closed position.

4. In a carbureter, the combination of a primary carbureter comprising a mixing chamber, a throttle valve, a fuel nozzle, an air passage leading to the mixing chamber, and a yielding valve for said passage actuated by the movement of air through the passage; and a secondary carbureter supplementing the delivery of mixture from the primary carbureter and normally out of action, comprising means for augmenting the fuel supply, a secondary air passage leading to the mixing chamber, and devices presenting a non-yielding resistance to the flow of air through the secondary air passage comprising a closure valve for said secondary air passage.

5. In a carbureter, the combination of a primary carbureter comprising a mixing chamber, a throttle valve, a fuel nozzle, an air passage leading to the mixing chamber, and a yielding valve for said passage actuated by a movement of air through the the passage; and a secondary carbureter supplementing the delivery of mixture from the primary carbureter and normally out of action comprising a secondary fuel nozzle, a secondary air passage leading to the mixing chamber and to which the secondary fuel nozzle leads, devices presenting a non-yielding resistance to the flow of air through the secondary air passage comprising a closure valve for the air passage, and devices acting through the latter portion of the opening movement of the throttle for opening the closure valve.

6. In a carbureter, the combination of a primary carbureter comprising a throttle valve, a fuel nozzle, an air inlet, and a choke valve for varying the air inlet to vary the normal quality of mixture; and a secondary carbureter supplementing the delivery of mixture from the primary carbureter normally out of action and comprising a fuel nozzle, an air passage to which the nozzle leads, a closure valve for closing the passage, and devices acting through the latter portion of the opening movement of the throttle for opening the closure valve.

7. In a carbureter, the combination of a mixing chamber; a main throttle valve; a primary air passage leading to the mixing chamber; a primary gasolene jet located in the primary air passage; an auxiliary air passage; a spring opposed valve controlling the flow of air through the auxiliary air passage and arranged so as to cooperate with the primary gasolene jet in maintaining a practically uniform ratio of gasolene to air; a secondary air passage leading to the mixing chamber; a second gasolene jet located in the secondary air passage; and devices presenting a non-yielding resistance to the flow of air through said secondary passage comprising a closure valve arranged to be opened during the latter part of the opening movement of the main throttle valve.

8. In a carbureter, the combination of a primary carbureter having a mixing chamber, and throttle valve, a primary air passage leading to the mixing chamber, a primary fuel jet located in the primary air passage, an auxiliary air passage leading to the mixing chamber, and a spring opposed valve controlling said auxiliary passage and arranged to coöperate with the primary fuel jet and primary air passage in maintaining a practically uniform ratio of fuel and air; a secondary carbureter comprising an air passage leading to the mixing chamber, devices presenting a non-yielding resistance to the flow of air through the secondary passage comprising a closure valve for said secondary passage, means actuated with the throttle for operating said closure valve during the later stages of the opening of the throttle, and means for augmenting the flow of fuel to the mixing chamber as the closure valve is opened.

9. In a carbureter, the combination of a primary carbureter comprising a mixing chamber, a throttle valve, a fuel nozzle, an air inlet; means for varying the air inlet to vary the quality of mixture, an air passage leading from the inlet to the mixing chamber; and a spring closed valve initially resisting the flow of air to the primary carbureter; and a secondary carbureter supplementing the delivery of mixture from the primary carbureter and normally out of action comprising a fuel nozzle, a fixed air passage leading to the mixing chamber to which the nozzle leads; and means presenting a non-yielding resistance to the flow of air through said passage comprising a closure valve for closing the passage.

10. In a carbureter, the combination of a primary carbureter comprising a mixing chamber; a throttle valve controlling the flow from the mixing chamber, a fuel nozzle, and an air inlet; and a secondary carbureter supplementing the delivery of mixture from the primary carbureter and normally out of action comprising a fuel nozzle, an air passage to which the nozzle leads inclined to the direction of the flow of air through the mixing chamber, and a closure valve in said air passage.

11. In a carbureter, the combination of a primary carbureter provided with a mixing chamber, and means for supplying air and fuel to said carbureter in proportions to form a comparatively lean mixture; a secondary carbureter delivering to the mixing chamber of the primary carbureter and comprising a separate air passage, means for augmenting the fuel delivered by the primary carbureter and in proportion to the air delivered through the separate air passage of the secondary carbureter to form a mixture richer than that of the primary carbureter, and means for throwing in the primary and secondary carbureters successively, the mixture being delivered in the initial stages by the primary carbureter alone.

12. In a carbureter, the combination of a primary carbureter provided with a mixing chamber, and means for supplying air and fuel to said carbureter in proportions to form a comparatively lean mixture; a secondary carbureter delivering to the mixing chamber of the primary carbureter comprising a separate air passage, means for delivering fuel to the secondary air passage in proportion to the air delivered through the separate air passage to form a mixture richer than that of the primary carbureter, and means for throwing in the primary and secondary carbureters successively, the mixture being delivered in the initial stages by the primary carbureter alone.

13. In a carbureter, the combination of a primary carbureter provided with a mixing chamber, and means for supplying air and fuel to said carbureter in proportions to form a comparatively lean mixture; a secondary carbureter delivering to the mixing chamber of the primary carbureter and comprising a separate air passage, means for augmenting the fuel delivered by the primary carbureter and in proportion to the air delivered through the separate air passage of the secondary carbureter to form a mixture richer than that of the primary carbureter, means for throwing in the primary and secondary carbureters successively, the mixture being delivered in the initial stages by the primary carbureter alone, and a pick-up device acting with the opening of the throttle for supplementing the normal supply of fuel delivered by the primary carbureter.

14. In a carbureter, the combination of a primary carbureter provided with a mixing chamber, and means for supplying air and fuel to said carbureter in proportions to form a comparatively lean mixture; a secondary carbureter delivering to the mixing chamber of the primary carbureter comprising a separate air passage, means for delivering fuel to the secondary air passage in proportion to the air delivered through the separate air passage to form a mixture richer than that of the primary carbureter, means for throwing in the primary and secondary carbureters successively, the mixture being delivered in the initial stages by the primary carbureter alone, and a pick-up device acting with the opening of the throttle for supplementing the normal supply of fuel delivered by the primary carbureter.

15. In a carbureter, the combination of a mixing chamber; a throttle valve; means for delivering air and fuel to said chamber; a receptacle; and a plunger in the receptacle actuated with the opening of the throttle to discharge fuel from the receptacle to supplement the normal charge of fuel, said plunger acting to supplement said normal supply without disturbing said normal supply.

16. In a carbureter, the combination of a carbureter passage; a throttle controlling said passage; a fuel chamber supplying fuel to said passage; a pick-up device comprising a receptacle to which fuel is supplied; a connection between the receptacle and said passage; a vent above the normal fuel level in the receptacle normally preventing an indrawing of fuel through said connection by suction; and means acting with the opening of the throttle for forcing fuel into the path of the air passing through the vent and connection to deliver the fuel with the air to the mixing chamber through said connection.

17. In a carbureter, the combination of a carbureter passage; a throttle controlling said passage; a fuel chamber supplying fuel to said passage; a pick-up device comprising a receptacle to which fuel is supplied, a connection between the receptacle and said passage; a vent above the normal fuel level in the receptacle normally preventing an indrawing of fuel through said connection by suction; and means actuated by fluctuations in the degree of vacuum at the discharge side of the throttle for forcing the fuel into the path of the air passing through the vent and connection to deliver the fuel with the air to the mixing chamber through said connection.

18. In a carbureter, the combination of a carbureter passage; a throttle controlling said passage; a fuel chamber supplying fuel to said passage; a pick-up device comprising a receptacle to which fuel is supplied; a connection between the receptacle and said passage; a vent above the normal fuel level in the receptacle normally preventing an indrawing of fuel through said connection by suction; a plunger in the receptacle adapted to elevate the fuel into the path of the air passing through the vent and connection to deliver the fuel with the air to the mixing chamber through said connection; and means acting with the opening of the throttle for actuating the plunger.

19. In a carbureter, the combination of a carbureter passage; a throttle controlling said passage; a fuel chamber supplying fuel to said passage; a pick-up device comprising a receptacle to which fuel is supplied; a connection between the receptacle and said passage; a vent above the normal fuel level in the receptacle normally preventing an indrawing of fuel through said connection by suction; a plunger in the receptacle adapted to elevate the fuel into the path of the air passing through the vent and connection to deliver the fuel with the air to the mixing chamber through said connection; and means actuated by fluctuations in the degree of vacuum at the discharge side of the throttle for actuating said plunger.

20. In a carbureter, the combination of a mixing chamber; means for delivering air and fuel to said chamber; a throttle valve; and devices actuated by fluctuations in the degree of vacuum at the discharge side of the throttle for momentarily supplementing the normal delivery of fuel, said devices acting to augment said normal supply without disturbing said normal supply.

21. In a carbureter, the combination of a mixing chamber; a throttle valve; means for delivering air and fuel to said chamber; a pick-up receptacle; and devices subjected to fluctuations of pressure at the discharge side of the throttle and acting under the influence of such fluctuations to fill the receptacle on the closing of the throttle and to discharge the fuel from the receptacle to supplement the normal fuel supply when the throttle opens, said devices acting to supplement said normal fuel supply without disturbing said normal supply.

22. In a carbureter, the combination of a mixing chamber; a throttle valve; means for delivering air and fuel to said chamber; a receptacle; and a plunger in the receptacle actuated by fluctuations of pressure at the discharge side of the throttle to discharge fuel from the receptacle to supplement the normal charge of fuel as the throttle is opened, said plunger acting to supplement the normal supply of fuel without disturbing said normal supply.

23. In a carbureter, the combination of a mixing chamber; means for delivering air and fuel to said chamber; a throttle valve; a receptacle; a pressure motor having its active element subjected to pressures varying as the pressure at the discharge side of the throttle varies; and a plunger in the receptacle actuated by said motor to discharge fuel from said receptacle as the throttle opens.

24. In a carbureter, the combination of a mixing chamber; means for delivering air and fuel to said chamber; a throttle valve; a pump chamber; a plunger in said chamber; a cylinder connected with the carbureter at the discharge side of the throttle; and a piston in the cylinder connected with the plunger.

25. In a carbureter, the combination of a mixing chamber; means for delivering air and fuel to said chamber; a throttle valve; a pump chamber having an air passage leading to the upper part of said chamber and a passage leading from said chamber to the carbureter, a plunger in said chamber; a cylinder connected with the carbureter at the discharge side of the throttle; and a piston in the cylinder connected with the plunger.

26. In a carbureter, the combination of a mixing chamber; means for delivering air and fuel to said chamber; a throttle valve; a pump chamber; a cylinder connected with the carbureter at the discharge side of the throttle valve and with the mixing chamber and with the outer air; a pump plunger in said chamber arranged to permit the passage of fuel thereby; and a piston connected with the plunger in said cylinder.

27. In a carbureter, the combination of a mixing chamber; means for delivering air and fuel to the chamber; a throttle valve; a pump chamber and a cylinder having a connection with the carbureter at the discharge side of the throttle and having a connection to the mixing chamber and to the outer air; a restricted opening in the bottom thereof leading to the fuel supply; a plunger in said chamber; and a piston in the cylinder connected with the plunger, said plunger being adapted when in its lower position to close the fuel connection.

28. In a carbureter, the combination of a primary carbureter comprising a mixing chamber, a throttle, a fuel nozzle leading to the mixing chamber, an air inlet to the mixing chamber, and means for momentarily and automatically supplementing the flow of fuel as the throttle is opened; a secondary carbureter comprising an air passage leading to the mixing chamber, a fuel nozzle leading to said passage, a closure valve for the passage, and means for automatically opening the closure valve as the throttle approaches open position.

29. In a carbureter, the combination of a primary carbureter comprising a mixing chamber, a throttle, a fuel nozzle leading to the mixing chamber, an air inlet to the mixing chamber, said fuel nozzle and air inlet having a relation to deliver a lean mixture, and means for momentarily and automatically supplementing the flow of fuel as the throttle is opened; a secondary carbureter comprising an air passage leading to the mixing chamber, a fuel nozzle leading to said passage, a closure valve for the passage, said fuel nozzle and passage having a relation to deliver a rich mixture, and means for automatically opening the closure valve as the throttle approaches open position.

30. In a carbureter, the combination of a primary carbureter comprising a mixing chamber, a throttle valve controlling the flow of mixture from the mixing chamber, a fuel nozzle, and an air inlet; and a secondary carbureter supplementing the delivery of mixture from the primary carbureter and normally out of action comprising a fuel nozzle, an air passage to which the nozzle leads, said air passage being inclined to the direction of flow of the air through the mixing chamber, and a closure valve in said air passage.

31. In a carbureter, the combination of a suction passage; means for delivering a combustible mixture comprising as its elements air and fuel to said passage; a throttle in said suction passage; a valve modifying a flow of one of said elements to said passage; and devices actuated by fluctuations in the degree of vacuum at the discharge side of the throttle controlling said valve and enriching the mixture with an increase of vacuum.

32. In a carbureter, the combination of a suction passage; means for delivering a combustible mixture comprising as its elements air and fuel to said passage; a throttle in said passage; a valve modifying a flow of both of said elements to said passage; and devices actuated by fluctuations in the degree of vacuum at the discharge side of the throttle controlling said valve and enriching the mixture with an increase of vacuum.

33. In a carbureter, the combination of a suction passage; means for delivering the combustible mixture comprising as its elements air and fuel to said passage; a throttle in said passage; a valve modifying a flow of one of said elements to said passage; and a pressure motor having its active element subjected to pressures varying as the pressures at the discharge side of the throttle vary actuating said valve and enriching the mixture with an increase of vacuum.

34. In a carbureter, the combination of a suction passage; means for delivering air and fuel to said passage; a throttle in said passage; a valve modifying the flow of fuel to said passage; and devices actuated by fluctuations in the degree of vacuum at the discharge side of the throttle controlling said valve and enriching the mixture with an increase of vacuum.

35. In a carbureter, the combination of a suction passage; means for delivering air and fuel to said passage; a throttle in said passage; a valve modifying the flow of air to said passage; and devices actuated by fluctuations in the degree of vacuum at the discharge side of the throttle controlling said valve and enriching the mixture with an increase of vacuum.

36. In a carbureter, the combination of a suction passage; means for delivering air and fuel to said passage; an auxiliary passage leading to the suction passage for augmenting the fuel supply to said suction passage; a throttle in the suction passage; a valve controlling the flow of fuel through said auxiliary passage; and devices actuated by fluctuations in the degree of vacuum at the discharge side of the throttle controlling said valve.

37. In a carbureter, the combination of a suction passage; a throttle in said passage; means for delivering air and fuel to said passage; an auxiliary passage leading to the suction passage and delivering mixture comprising as elements air and fuel to the suction passage; a valve modifying the flow of one of said elements through said auxiliary passage; and devices actuated by fluctuations in the degree of vacuum at the discharge side of the throttle controlling said valve.

38. In a carbureter, the combination of a suction passage; a throttle in said passage; means for delivering air and fuel to said passage; an auxiliary passage leading to the suction passage for augmenting the fuel supply to said suction passage comprising a well to which air and fuel are delivered and from which they are discharged to the suction passage; a valve modifying the flow of fuel to the well; and devices actuated by fluctuations in the degree of vacuum at the discharge side of the throttle controlling said valve.

39. In a carbureter, the combination of a suction passage; a throttle in said passage; means for delivering air and fuel to said passage; an auxiliary passage leading to the suction passage for augmenting the fuel supply to said suction passage comprising a well to which air and fuel are delivered and from which they are discharged to the suction passage; a valve modifying the flow of fuel and air to the well; and devices actuated by fluctuations in the degree of vacuum at the discharge side of the throttle controlling said valve.

40. In a carbureter, the combination of a suction passage; a throttle in said passage; means for delivering air and fuel to said passage; an auxiliary passage leading to the suction passage and modifying by delivery therethrough the mixture of the suction passage; a vent in said auxiliary passage; a valve mechanism modifying the flow of air through said auxiliary passage; and devices actuated by fluctuations in the degree of vacuum at the discharge side of the throttle controlling said valve.

In testimony whereof we have hereunto set our hands.

FRANK H. BALL.
FREDERICK O. BALL.